United States Patent
Wi et al.

(10) Patent No.: US 12,179,748 B2
(45) Date of Patent: Dec. 31, 2024

(54) VEHICLE AND METHOD OF CONTROLLING THE SAME

(71) Applicants: Hyundai Motor Company, Seoul (KR); Kia Corporation, Seoul (KR)

(72) Inventors: Hyoungjong Wi, Seoul (KR); Dong Hyun Sung, Hwaseong-Si (KR); Yongseok Kwon, Suwon-Si (KR); Tae-Geun An, Yeongju-Si (KR); Joon Ho Lee, Seoul (KR); Eungseo Kim, Gwacheon-Si (KR); Sangmin Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 223 days.

(21) Appl. No.: 18/077,376

(22) Filed: Dec. 8, 2022

(65) Prior Publication Data
US 2023/0365125 A1   Nov. 16, 2023

(30) Foreign Application Priority Data

May 11, 2022 (KR) .......................... 10-2022-0057969

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 40/114* (2013.01);
(Continued)

(58) Field of Classification Search
CPC ...... B60W 30/09; B60W 30/02; B60W 30/08; B60W 30/18; B60W 10/18; B60W 10/20;
(Continued)

(56) References Cited

U.S. PATENT DOCUMENTS

| 11,875,575 B2* | 1/2024 | Gali | ......................... G06T 7/73 |
| 2019/0202251 A1 | 7/2019 | Hall et al. | |
| 2019/0210418 A1* | 7/2019 | Hall | ..................... B60W 30/00 |

FOREIGN PATENT DOCUMENTS

| AU | 2012272543 | * 1/2014 | ............. B61R 21/34 |
| KR | 10-2012-0114994 A | 10/2012 | |

(Continued)

*Primary Examiner* — Hai H Huynh
(74) *Attorney, Agent, or Firm* — Banner & Witcoff, Ltd.

(57) ABSTRACT

A vehicle may include a camera configured to obtain image data associated with an image. The image may include a trailer being in proximity to the vehicle in an external field of view. The vehicle may further include a radar associated with a second external field of view of the vehicle and configured to obtain radar data associated with the trailer in the second external field of view, and a controller. The controller may be configured to determine whether the trailer is coupled to the vehicle by processing the image data and the radar data, perform at least one of: generating a warning signal or controlling a braking device based on a forward collision-avoidance assist (FCA) function, and change at least one of: a timing of the generating the warning signal or an operation of the controlling the braking device based on the trailer being coupled to the vehicle.

20 Claims, 12 Drawing Sheets

(51) Int. Cl.
  *B60W 40/114* (2012.01)
  *B60W 40/13* (2012.01)
  *B60W 50/14* (2020.01)
  *G01S 13/86* (2006.01)
  *G01S 13/931* (2020.01)

(52) U.S. Cl.
  CPC ............ *B60W 40/13* (2013.01); *B60W 50/14* (2013.01); *G01S 13/867* (2013.01); *B60W 2420/403* (2013.01); *B60W 2420/408* (2024.01); *B60W 2422/90* (2013.01); *G01S 2013/93185* (2020.01); *G01S 2013/93272* (2020.01)

(58) Field of Classification Search
  CPC .... B60W 40/114; B60W 40/13; B60W 40/02; B60W 40/107; B60W 50/14; B60W 2420/403; B60W 2420/408; B60W 2422/90; B60W 2050/143; B60W 2300/14; B60W 2300/145; B60W 2520/105; B60W 2530/10; G01S 13/867; G01S 13/931; G01S 2013/93185; G01S 2013/93272; B60R 11/04; B60Y 2200/148
  USPC .......................... 701/36, 39, 43, 48, 70, 72
  See application file for complete search history.

(56) References Cited

FOREIGN PATENT DOCUMENTS

| | | | |
|---|---|---|---|
| KR | 101734245 B1 | 5/2017 | |
| KR | 10-2018-0121049 A | 11/2018 | |
| KR | 10-2020-0123892 A | 11/2020 | |
| KR | 10-2020-0134714 A | 12/2020 | |
| KR | 10-2021-0057746 A | 5/2021 | |
| KR | 10-2021-0077882 A | 6/2021 | |
| WO | WO 2024081306 | * 4/2020 | ............ B62D 15/02 |

* cited by examiner (HEAVY-WEIGHT)

VEHICLE AND METHOD OF CONTROLLING THE SAME

CROSS-REFERENCE TO RELATED APPLICATION(S)

This application claims the benefit of Korean Patent Application No. 10-2022-0057969, filed on May 11, 2022, which application is hereby incorporated herein by reference.

BACKGROUND

Vehicles may be pulled by fastening a trailer to a tow at the rear of the vehicles for various purposes. A trailer may include an unpowered vehicle that moves product or people, and has been widely used for camping purposes.

A connection between a vehicle and a trailer may be checked with a human eye, and a state of the trailer depends on a driver's intuition during driving.

A braking of a trailer depends on braking force of a vehicle providing power. Accordingly, when the vehicle performs emergency braking, the trailer may be bent by inertial force, which is called jackknifing effect.

If conditions of a trailer may be considered by a vehicle itself, secondary accidents such as jackknife may be prevented.

SUMMARY

The following summary presents a simplified summary of certain features. The summary is not an extensive overview and is not intended to identify key or critical elements.

The present disclosure provides a vehicle configured for providing optimal braking control in consideration of trailer characteristics, and a method of controlling the same.

Additional features will be set forth in part in the description which follows and, in part, will be obvious from the description, or may be learned by practice of the disclosure.

A vehicle may comprise: a camera configured to capture an external field of view of the vehicle and configured to obtain image data associated with an image, wherein the image comprises a trailer being in proximity to the vehicle in the external field of view; a radar associated with a second external field of view of the vehicle and configured to obtain radar data associated with the trailer in the second external field of view; and a controller configured to: determine, based on the image data and the radar data, whether the trailer is coupled to the vehicle; perform, based on a forward collision-avoidance assist (FCA) function, at least one of: generating a warning signal, or controlling a braking device; and change, based on the trailer being coupled to the vehicle, at least one of: a timing of the generating the warning signal, or an operation of the controlling the braking device.

The camera may comprise a rear camera to obtain a rear view of the vehicle to capture the image comprising the trailer. The radar may comprise a rear right corner radar installed on a right side of a rear bumper of the vehicle to have a field of sensing associated with a rear right side of the vehicle, and a rear left corner radar installed on a left side of the rear bumper of the vehicle to have a field of sensing associated with a rear left side of the vehicle. The controller may be further configured to obtain, based on the radar data, coordinates of a plurality of detection points on a side of the trailer.

The controller may be further configured to: obtain, among the plurality of detection points, coordinates of a central point located in a middle of the side of the trailer; and calculate, based on the coordinates of the central point and coordinates of a rotation axis associated with the trailer, a rotation angle of the trailer.

The controller may be further configured to: obtain coordinates of a plurality of points located at opposite ends of the plurality of detection points; and calculate, based on the coordinates of the plurality of points and the coordinates of the rotation axis of the trailer, a length of the trailer.

The controller may be further configured to, based on the rotation angle of the trailer being greater than or equal to a predetermined angle: control the braking device so that deceleration of the vehicle does not exceed a threshold deceleration value, and generate the warning signal.

The controller may be further configured to, based on the rotation angle of the trailer being less than a predetermined angle and an acceleration of the vehicle being detected: advance the timing of generating the warning signal and delay a timing of controlling the braking device.

The controller may be further configured to, based on the rotation angle of the trailer being less than a predetermined angle and a deceleration of the vehicle being detected: delay the timing of generating the warning signal and delay a timing of controlling the braking device.

The controller may be further configured to: determine a braking control of the braking device based on: a position of the trailer; the rotation angle of the trailer being less than a predetermined angle; and an operation of a steering wheel of the vehicle being not detected.

The controller may be further configured to: calculate, based on the rotation angle of the trailer being less than a predetermined angle and a steering wheel manipulation of the vehicle being detected, a curvature of a road on which the vehicle is traveling; and based on the curvature being equal to or greater than a predetermined reference, control the braking device so that deceleration of the vehicle does not exceed a threshold deceleration value and generate the warning signal.

The controller may be further configured to: determine stability of the trailer based on at least one of: the rotation angle of the trailer; or a weight of the trailer; and determine, based on the determined stability, a deceleration amount of the braking device.

A method may comprise: obtaining, by a controller of a vehicle, image data associated with an image, wherein the image comprises a trailer being in proximity to the vehicle; obtaining, by the controller, radar data associated with the trailer; determining, by the controller and based on the image data and the radar data, whether the trailer is coupled to the vehicle; performing, by the controller and based on a forward collision-avoidance assist (FCA) function, at least one of: generating a warning signal, or controlling a braking device; and changing, by the controller and based on the trailer being coupled to the vehicle, at least one of: a timing of generating the warning signal, or an operation of the controlling the braking device.

The obtaining the image data may comprise: obtaining, by the controller, the image data via a rear camera of the vehicle; obtaining the radar data comprises: obtaining, by the controller, the radar data via a rear right corner radar installed on a right side of a rear bumper of the vehicle and a rear left corner radar installed on a left side of the rear bumper of the vehicle. The method may further comprise obtaining, by the controller and based on the radar data, coordinates of a plurality of detection points on a side of the trailer.

The method may further comprise obtaining, by the controller and among the plurality of detection points, coordinates of a central point located in a middle of the side of the trailer; and calculating, based on the coordinates of the central point and coordinates of a rotation axis of the trailer, a rotation angle of the trailer.

The method may further comprise obtaining, by the controller, coordinates of a plurality of points located at opposite ends of the plurality of detection points; and calculating, by the controller and based on the coordinates of the plurality of points and the coordinates of the rotation axis of the trailer, a length of the trailer.

The method may further comprise, based on the rotation angle of the trailer being greater than or equal to a predetermined angle: controlling, by the controller, the braking device so that deceleration of the vehicle does not exceed a threshold deceleration value; and generating the warning signal.

The method may further comprise, based on the rotation angle of the trailer being less than a predetermined angle and an acceleration of the vehicle being detected: advancing, by the controller, the timing of generating the warning signal; and delaying, by the controller, a timing of controlling the braking device.

The method may further comprise, based on the rotation angle of the trailer being less than a predetermined angle and a deceleration of the vehicle being detected: delaying, by the controller, the timing of generating the warning signal and a timing of controlling the braking device.

The method may further comprise determining, by the controller, a braking control of the braking device based on: a position of the trailer; the rotation angle of the trailer being less than a predetermined angle; and an operation of a steering wheel of the vehicle being not detected.

The method may further comprise calculating, by the controller and based on the rotation angle of the trailer being less than a predetermined angle and a steering wheel manipulation of the vehicle being detected, a curvature of a road on which the vehicle is traveling; and based on the curvature being equal to or greater than a predetermined reference, controlling, by the controller, the braking device so that deceleration of the vehicle does not exceed a threshold deceleration value and generating, by the controller, the warning signal.

The method may further comprise determining, by the controller, stability of the trailer based on at least one of: the rotation angle of the trailer; or a weight of the trailer; and determining, by the controller and based on the determined stability, a deceleration amount of the braking device.

These and other features and advantages are described in greater detail below.

BRIEF DESCRIPTION OF THE DRAWINGS

These and/or other aspects of the disclosure will become apparent and more readily appreciated from the following description, taken in conjunction with the accompanying drawings, in which.

DETAILED DESCRIPTION

Figure 1:
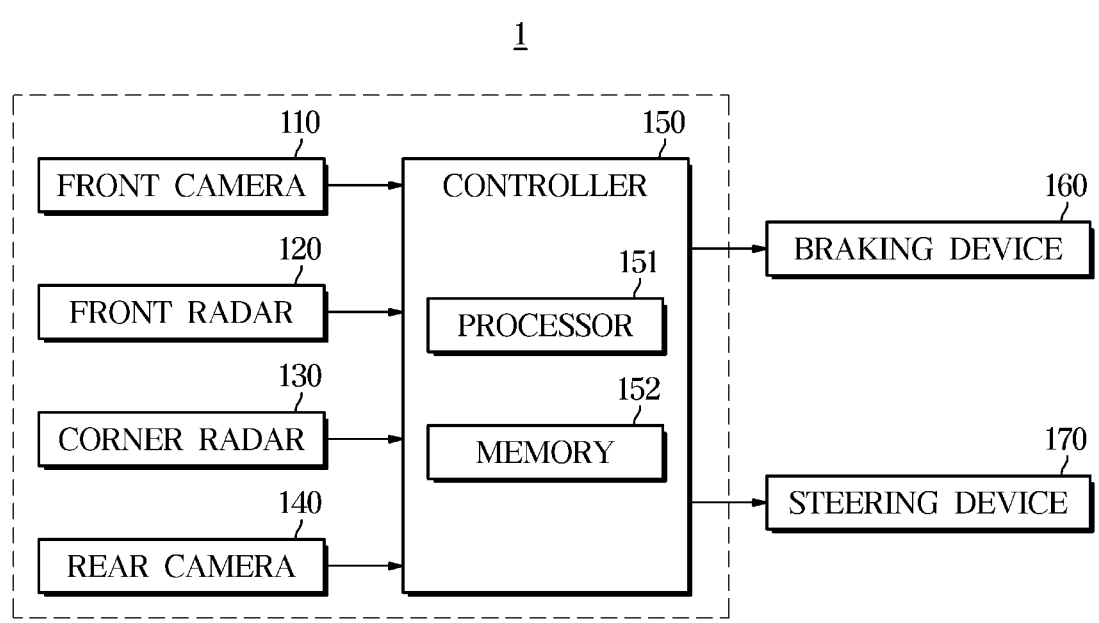
FIG. 1 is a control block diagram illustrating a vehicle.

Reference will now be made in detail to various examples of the disclosure. Examples of which are illustrated in the accompanying drawings, wherein like reference numerals refer to like elements throughout. This specification may not describe all elements of the disclosed embodiment(s) and detailed descriptions of what is well known in the art or redundant descriptions on substantially the same configurations may be omitted. The terms 'part', 'module', 'member', 'block' and the like as used in the specification may be implemented in software and/or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, various examples of the present disclosure will be described in detail with reference to the accompanying drawings.

Figure 2:
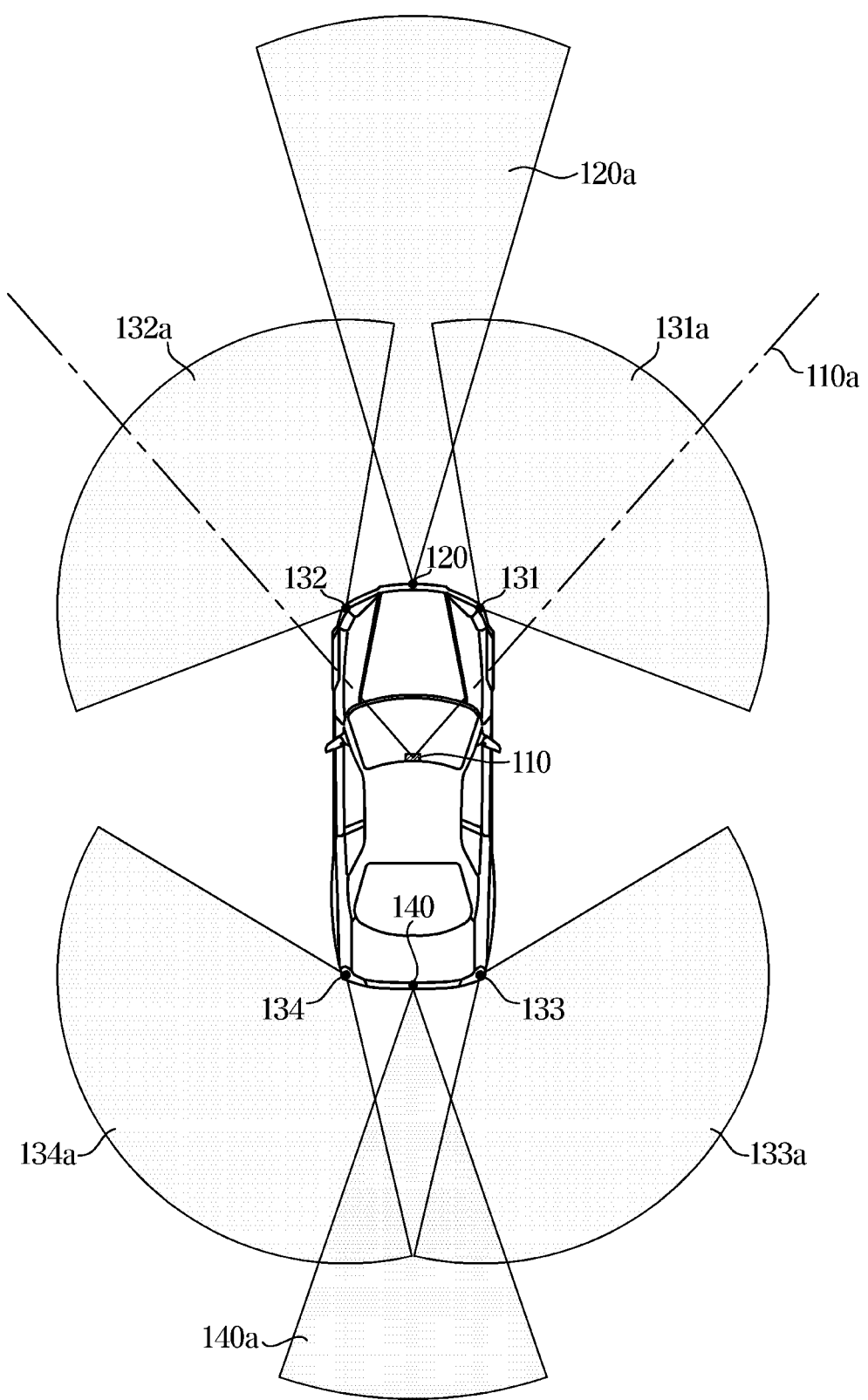
FIG. 2 is a view illustrating a detection area of a camera and a radar included in a vehicle.
Figure 3:
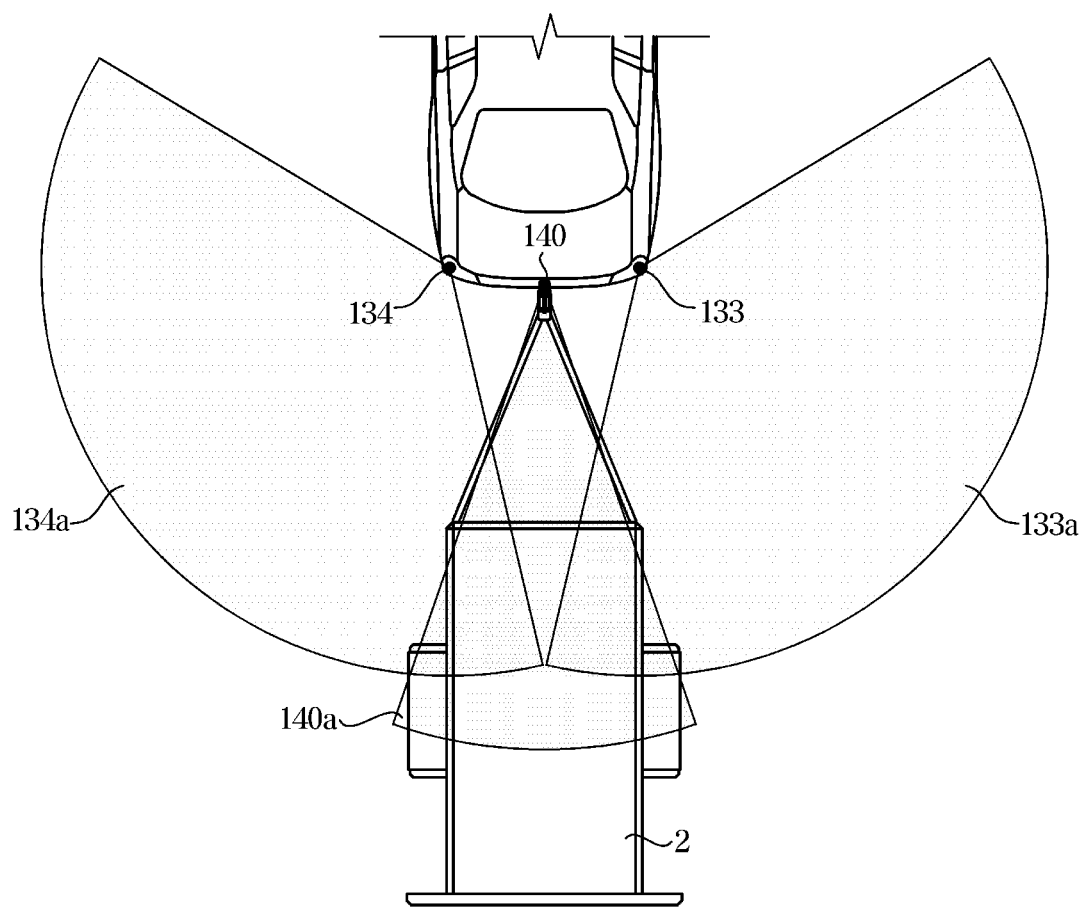
FIG. 3 is a view illustrating a state in which a vehicle is coupled to a trailer.

FIG. 1 is a control block view illustrating a vehicle, FIG. 2 is a view illustrating a detection area of a camera and radar included in a vehicle, and FIG. 3 is a view illustrating a state in which a vehicle is coupled to a trailer.

A vehicle 1 may include a front camera 110, a front radar 120, a corner radar 130, a rear camera 140, a controller 150, a braking device 160, and a steering device 170. The front camera 110, the front radar 120, the corner radar 130, and the rear camera 140 may assist and realize advanced driver assistance system (ADAS) by recognizing an object, a lane, an obstacle, and the like. A trailer may be fastened to a vehicle (e.g., the vehicle 1).

The braking device 160 may temporarily brake wheels of the vehicle 1 in response to an input associated with a brake pedal and/or a slip of the wheels and/or data processing results of ADAS.

The steering device 170 may temporarily or continuously control a traveling direction of the vehicle 1 in response to a driver's steering operation using a steering wheel and/or the data processing results of ADAS.

ADAS may assist a driver to operate (e.g., driving, braking, steering) the vehicle 1. For example, ADAS may detect environments around the vehicle 1 (e.g., other vehicles, pedestrians, cyclists, lanes, road signs, etc.), and control the driving and/or braking and/or steering of the vehicle 1 in accordance with the detected environments. Hereinafter, the object may include all other vehicles, cyclists, and the like, which are objects that may collide with the vehicle driving 1 in surrounding environments.

The controller 150 may transmit a driving control signal, a braking signal, and/or a steering signal to the braking device 160 and/or the steering device 170 via a communication network for vehicle (NT).

ADAS may provide a variety of functions to the driver. For example, ADAS may provide lane departure warning (LDW), lane keeping assist (LKA), high beam assist (HBA), autonomous emergency braking (AEB), traffic sign recognition (TSR), smart cruise control (SCC), blind spot detection (BSD), and forward collision-avoidance assist (FCA), and the like.

ADAS may include at least one of the front camera 110, the front radar 120, a plurality of corner radars 131, 132, 133, and 134 (collectively, 130), and the rear camera 140.

The front camera 110 may secure a field of view 110a (see FIG. 2) facing the front of the vehicle 1. The front camera 110 may detect an object moving in the front view or may detect an object traveling in an adjacent lane in the front view.

The front camera 110 may be installed on a front bumper, a front windshield of the vehicle 1, or the like. The front camera 110 may photograph the front side of the vehicle 1 and obtain image data of the front side of the vehicle 1. The image data in front of the vehicle 1 may include location information on at least one of: other vehicles, pedestrians, cyclists, lanes, curbs, guard rails, street trees, and/or street lights positioned in front of the vehicle 1.

The rear camera 140 may secure a field of view 140a (see FIG. 2) facing a rear side of the vehicle 1. The rear camera 140 may detect an object moving in the rear view or may detect an object traveling in an adjacent lane in the rear view. The rear camera 140 may detect a trailer 2 coupled at the rear end of the vehicle 1.

The rear camera 140 may be installed on a rear bumper, a rear windshield of the vehicle 1, or the like. The rear camera 140 may photograph the rear side of the vehicle 1 and obtain image data of the rear side of the vehicle 1.

The front and rear cameras 110 and 140 may obtain image data, so that the controller 150 processes the image data to detect the object and the trailer 2 included in the image data, and obtains motion information on the object and information of whether the trailer 2 is coupled or not.

The front radar 120 may have a field of sensing 120a facing the front side of the vehicle 1. The front radar 120 may be installed, for example, on a grille, a bumper of the vehicle 1, or the like.

The front radar 120 may include a transmission antenna (or a transmission antenna array) that radiates a transmitted wave toward the front side of the vehicle 1, and a reception antenna (or a reception antenna array) that receives a reflected wave reflected by an obstacle.

The front radar 120 may obtain front radar data from the transmitted wave transmitted by the transmission antenna and the reflected wave received by the reception antenna. The front radar data may include position information and a speed degree of an object located in front of the vehicle 1 (e.g., any other vehicle, a pedestrian, cyclist, etc.).

The front radar 120 may calculate a relative distance to an obstacle based on a phase difference (and/or time difference) between the transmitted wave and the reflected wave, and calculate a relative speed of the obstacle based on the frequency difference between the transmitted wave and the reflected wave. The front radar 120 may transmit the front radar data to the controller 150.

The plurality of corner radars 130 may include the first corner radar 131 installed on the front right side of the vehicle 1, the second corner radar 132 installed on the front left side of the vehicle 1, the third corner radar 133 installed on the rear right side of the vehicle 1, and the fourth corner radar 134 installed on the rear left side of the vehicle 1.

The first corner radar 131 may have a field of sensing 131a facing the front right side of the vehicle 1. The first corner radar 131 may be installed on the right side of a front bumper of the vehicle 1.

The second corner radar 132 may have a field of sensing 132a facing the front left side of the vehicle 1, and may be installed on the left side of the front bumper of the vehicle 1.

The third corner radar 133 may have a field of sensing 133a facing the rear right of the vehicle 1, and may be installed on the right side of a rear bumper of the vehicle 1.

The fourth corner radar 134 may have a field of sensing 134a facing the rear left of the vehicle 1, and may be installed on the left side of the rear bumper of the vehicle 1.

Each of the first, second, third, and fourth corner radars 131, 132, 133, and 134 may include a transmission antenna and a reception antenna.

The first, second, third and fourth corner radars 131, 132, 133 and 134 may obtain first corner radar data, second corner radar data, third corner radar data, and fourth corner radar data, respectively.

The third and fourth corner radars 133 and 134 may detect the trailer 2 coupled to the rear end of the vehicle 1 and obtain information on the trailer 2. The third and fourth corner radars 133 and 134 transmit radio waves with respect to the moving trailer 2 and receive the reflected radio waves to provide information associated with the received waves to the controller 150, and allow the controller 150 to process the radar data to determine position coordinates of each point of the trailer 2. The controller 150 may determine a rotation angle of the trailer 2 and a position of each point of the trailer 2 based on the position coordinates for each point of the trailer 2. A detailed description will be given with reference to FIGS. 4 and 5.

The first corner radar data may include distance information and speed degree regarding an object located on the front right side of the vehicle 1.

The second corner radar data may include distance information and a speed degree regarding an object located on the front left side of the vehicle 1.

The third and fourth corner radar data may include distance information and speed information on an object (e.g., a speed degree regarding the object) located on the rear right and left sides of the vehicle 1.

The first, second, third, and fourth corner radars 131, 132, 133, and 134 may transmit the first, second, third, and fourth corner radar data to the controller 150, respectively.

The controller 150 may process the image data of the front and rear cameras 110 and 140 and the corner radar data of the plurality of corner radars 130, and generate a control signal to control the braking device 160 and/or the steering device 170.

The controller 150 may include an image signal processor that is a processor 151 for processing the image data of the front and rear cameras 110 and 140 and/or a digital signal processor that processes the radar data of the radars 120 and 130, and/or a micro control unit (MCU) that generates a braking signal.

In response to image information (i.e., image data) being received from the cameras 110 and 140 when the driver assistance system or an autonomous driving system is executed, the controller 150 may recognize a lane on a road by performing image processing, recognize a host lane on which a host vehicle travels based on the recognized position information of the lane, determine whether both lane markers of the host lane are recognized, and control an autonomous driving based on both recognized lane makers upon determining that the both lane markers are recognized.

When FCA is performed, the controller 150 may identify objects in an image based on image information obtained by the front camera 110 and compare information regarding the identified objects with object information stored in the memory 152, thereby determining whether the objects in the image are stationary obstacles or moving obstacles.

In addition to the cameras 110 and 140, the controller 150 may obtain information regarding the objects based on a laser imaging detection and ranging (lidar) data of a lidar.

The memory 152 may store programs and/or data for processing image data, programs and/or data for processing radar data, and programs and/or data for the processor 151 to generate a braking signal and/or warning signal.

The memory 152 may temporarily store the image data received from the cameras 110 and 140 and/or the radar data received from the radars 120 and 130, and also temporarily store the processing results of the image data and/or the radar data of the memory 152.

The memory 152 may be implemented as at least one of a non-volatile memory device such as cache, read only memory (ROM), programmable ROM (PROM), erasable programmable ROM (EPROM), electrically erasable programmable ROM (EEPROM), and flash memory, or a volatile memory device such as random access memory (RAM), or a storage medium such as hard disk drive (HDD) and CD-ROM, but aspects are not limited thereto.

Referring to FIG. 3, the trailer 2 may be pulled by being coupled to the rear end of the vehicle 1, even though it has no power unit itself. The trailer 2 may be physically connected to a tow (not shown) in the rear bumper of the vehicle 1 so that it may rotate about a rotation axis (a position of the rear camera 140 in FIG. 3).

The trailer 2 may rotate left and right due to rotational inertia when a traveling direction of the vehicle 1 is changed. When the vehicle 1 decelerates rapidly, the trailer 2 rotates by being biased to one side due to an imbalance between the left and right inertia of the trailer 2. In other words, when the vehicle 1 performs an emergency braking, a secondary collision with another vehicle may be caused due to jackknife phenomenon in which the trailer 2 is bent by inertial force.

On the other hand, the vehicle 1 according to the disclosure may detect an object driving in front and perform a FCA function to prevent a collision with the object. However, if the trailer 2 is coupled to the vehicle 1, when a deceleration amount performed in the conventional FCA function is applied, the inertia force thereof may act on the trailer 2 disproportionately.

Deceleration of the vehicle 1 and/or the trailer 2 may be adjusted based on motion information of the trailer 2. The vehicle 1 may advance or delay a warning signal and/or a control signal by identifying whether the vehicle 1 and the trailer 2 are coupled or not, and by identifying a relative position between the vehicle 1 and the trailer 2. The vehicle 1 may adjust the deceleration amount determined in the conventional FCA function by estimating a weight in addition to a position of the trailer 2.

The vehicle 1 receives electrical signal(s) from the trailer 2 or receives data from the rear camera 140 and/or the rear radars 133 and 134 in order to identify whether the trailer 2 is coupled to the vehicle.

More specifically, in the case of the trailer 2 equipped with a communication function, the vehicle 1 may receive from the trailer 2 information on whether the coupling is complete, a rotation angle with the trailer 2, and specification information of the trailer 2.

The vehicle 1 may obtain information regarding the trailer 2 in the driver's setting information stored in the memory 152 according to a user setting mode (USM) function. The vehicle 1 may identify the specification of the trailer 2 including whether the trailer 2 is coupled or not and the weight through the USM function.

Unlike the trailer 2 described above, in the case of the trailer 2 that is not equipped with a communication function, the trailer 2 and a mounting portion of the trailer 2 may be recognized through the rear camera 140 and the radar data may be obtained by receiving the radio waves reflected from the trailer 2 through the rear radars 133 and 134. In this regard, it will be described in detail with reference to FIGS. 4 and 5.

Figure 4:
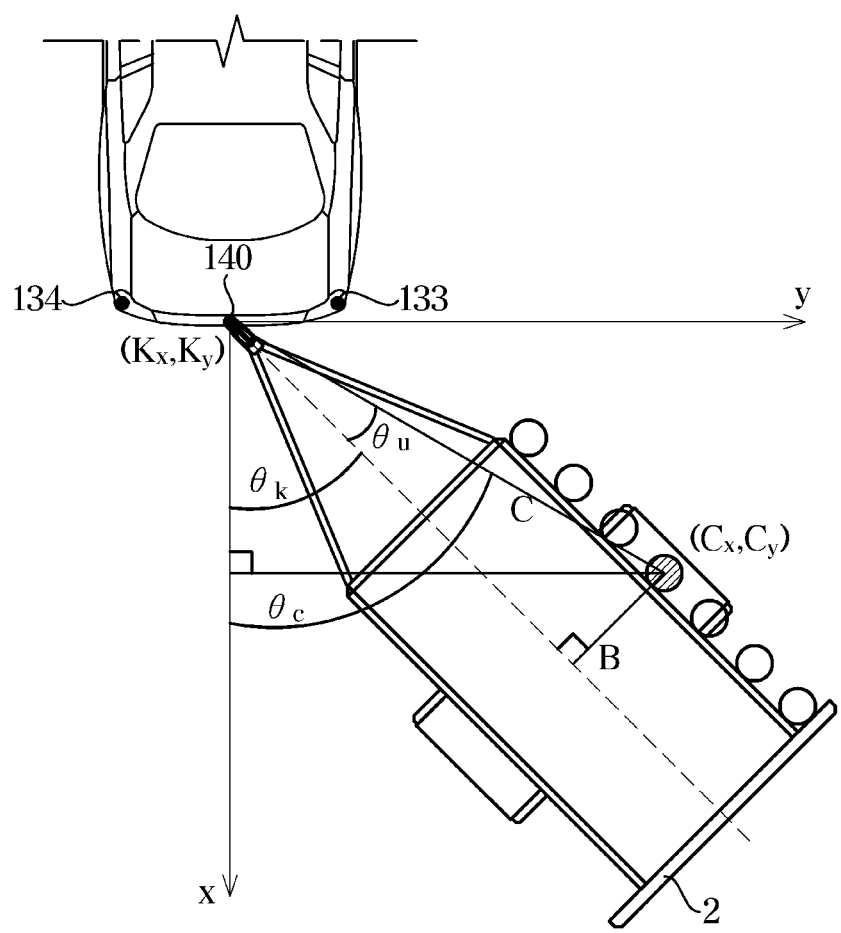
FIG. 4 is a view illustrating a rotation angle between a vehicle and a trailer.

FIG. 4 is a view illustrating a rotation angle between a vehicle and a trailer.

The controller 150 (see FIG. 1) may obtain a rotation angle θ_k between the vehicle 1 and the trailer 2 based on the radar data obtained through the rear radars 133 and 134.

The controller 150 may obtain the coordinates of a plurality of detection points located on the sides of the trailer 2 by processing the radar data obtained through the rear radars 133 and 134, and obtains the rotation angle θ_k of the trailer 2 at one time point based on the coordinates of the center point having an average of the plurality of detection points. Referring to FIG. 4, the controller 150 may obtain the rotation angle θ_k at one time point based on a distance between the origin and the center point with the position of the rear camera 140 as the origin. For a detailed calculation process, refer to Equation 1 below.

$$\theta_k = \theta_c - \theta_u \left( \theta_c = \sin^{-1}\left( \frac{|k_y - c_y|}{C} \right) \right) \quad \text{[Equation 1]}$$

$$\left( \theta_u = \sin^{-1}\left( \frac{B}{C} \right) \right), C = \sqrt{(k_x - c_x)^2 + (k_y - c_y)^2},$$

$B$ = a half of the width of the trailer

The controller 150, by averaging the rotation angle θ_k calculated based on Equation 1 and an angle estimated through the dynamic model according to a weight value, may predict change in the rotation angle θ_k of the trailer 2 by speed (low speed section, high speed section) and trailer model.

Figure 5:
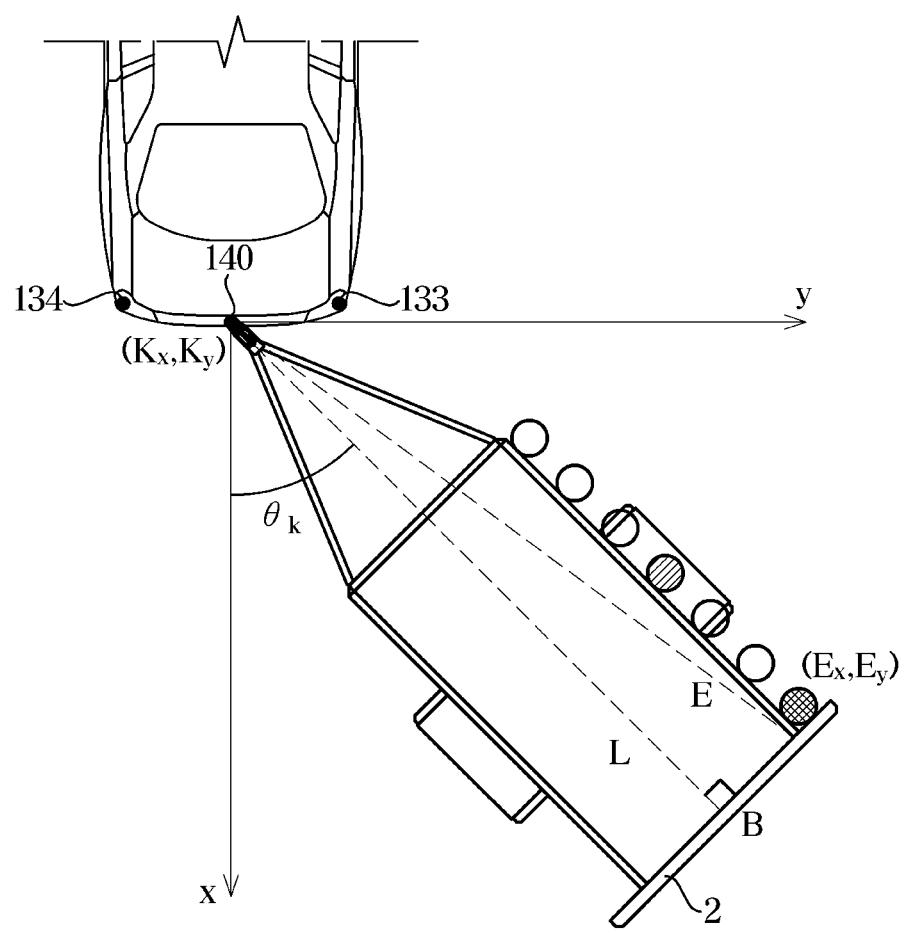
FIG. 5 is a view illustrating a process in which a vehicle measures a length of a trailer.

FIG. 5 is a view illustrating a process in which a vehicle measures a length of a trailer.

The controller 150 (see FIG. 1) may obtain a length L between the vehicle 1 and the trailer 2 based on the radar data obtained through the rear radars 133 and 134.

The controller 150 may obtain the coordinates of a plurality of detection points located on the sides of the trailer 2 by processing the radar data obtained through the rear radars 133 and 134, and obtain the length L between the vehicle 1 and the trailer 2 based on the coordinates of the detection point having the largest value among the plurality of detection points. For a detailed calculation process, refer to Equation 2 below.

$$\sqrt{(k_x-E_x)^2+(k_y-E_y)^2-B^2}$$ [Equation 2]

The controller 150 may obtain lateral longitudinal positions of the trailer 2 with respect to the vehicle 1 in real time based on the rotation angle θ_k and the length L.

In addition to the rotation angle θ_k and the length L obtained by the above-described process, the controller 150 may control a level of stability of the trailer 2 according to the combination of the motion information of the vehicle 1 and/or the motion information of the trailer 2, determine the deceleration amount of the braking device 160 according to the level of stability, and/or change a timing of braking control and/or warning signal.

The controller 150 may determine the deceleration amount of the braking device 160 or change the timing of the braking control and/or warning signal based on a speed of the vehicle 1, a steering angle of the vehicle 1, a steering angular velocity of the vehicle 1, an angle of an accelerator pedal of the vehicle 1, an angle of a brake pedal of the vehicle 1, and a yaw rate of the vehicle 1 among the motion information of the vehicle 1.

Furthermore, the controller 150 may determine the deceleration amount of the braking device 160 or change the timing of the braking control and/or warning signal based on a yaw rate of the trailer 2, a lateral force F_Lat of a connection axle of the trailer 2, and position information of the trailer 2 for the vehicle 1 and/or the lane, among the motion information of the trailer 2.

Various examples based on the above-described configurations will be described in detail with reference to FIGS. 6 and 7.

Figure 6:
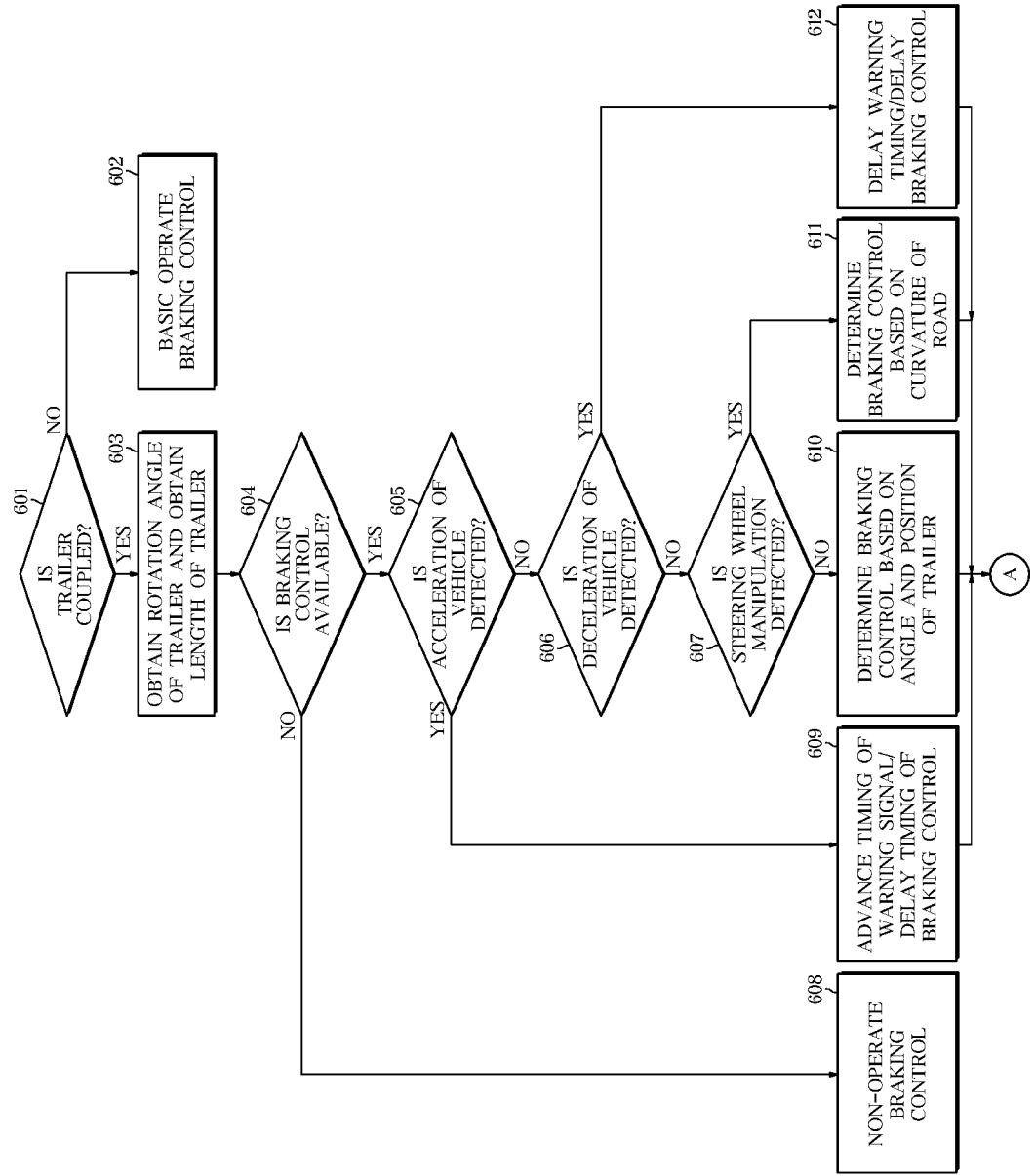
FIG. 6 is a flowchart illustrating a method for controlling a vehicle.

FIG. 6 is a flowchart illustrating a method of controlling a vehicle.

If the coupling (601) of the trailer 2 to the vehicle 1 is detected through the rear camera 140 and/or the rear radar 133 and 134, the controller 150 may obtain the rotation angle of the trailer 2 and the length of the trailer 2 (603).

If the coupling of the trailer 2 to the vehicle 1 is not detected, the controller 150 may operate the vehicle 1 based on the braking control in performing the FCA function (602).

The controller 150 may determine a state of the trailer 2 and determine whether the braking control is available (604). The controller 150 may not perform emergency braking control that basically operates for the vehicle 1 when the trailer 2 is coupled, but may perform basic braking control if various conditions are satisfied so that jackknife or swing phenomenon does not occur in consideration of the vehicle 1, the trailer 2, and/or road conditions. The various conditions may be determined based on motion information of the vehicle, motion information of the trailer 2, and the road conditions. If any one condition is not satisfied, the controller 150 may advance or delay the timing of a warning signal and/or a braking control. The controller 150 may adjust the deceleration amount of the braking device 160 under a certain condition.

If it is expected that the trailer 2 is swung when the vehicle 1 performs even a slight braking, the controller 150 may control the braking control implemented in the FCA function to be disabled (non-operated) (608).

In response to the acceleration of the vehicle 1 being detected (605), the controller 150 may control (e.g., advance) the timing of warning signal and/or delay the timing of braking control (609). In consideration of instantaneous behavior of the trailer 2 caused by the acceleration of the vehicle 1, the timing of warning advances, but the timing of braking control delays, thereby preventing jackknife phenomenon or swing phenomenon.

The controller 150 may control (e.g., advance) the timing of warning and delay the timing of braking control based on the angle of the accelerator pedal of the vehicle 1. For example, in response to the angle of the accelerator pedal input by the driver being 40% or more, the controller 150 may change the timing of warning signal and braking control. However, the above-described reference value of the accelerator pedal is only an example and may vary based on various values according to the specification of the trailer 2.

In response to the deceleration of the vehicle 1 being detected (606), the controller 150 may control (e.g., delay) the timing of warning and the timing of braking control (612). Considering that the driver is aware of a risk of collision to some extent when deceleration occurs, the vehicle 1 may delay the timing of warning and the timing of braking control together.

The controller 150 may delay the timing of warning and the timing of braking control based on the angle of the brake pedal of the vehicle 1. For example, in response to the angle of the brake pedal input by the driver being 20% or more, the controller 150 may change the timing of warning signal and braking control. However, the above-described reference value of the brake pedal is only an example and may vary based on various values according to the specification of the trailer 2.

The controller 150 may control the timing of braking control and/or the deceleration amount according to the detection of a steering wheel manipulation. The controller 150 may determine the driver's intention to steer based on the steering angle of the steering wheel (driving wheel) of the vehicle 1 and/or the steering angular velocity of the steering wheel.

In response to the manipulation of the steering wheel being not detected (607), the controller 150 may determine the braking control based on the angle and position of the trailer 2 (610). For example, if the vehicle 1 is going straight on a straight road, the braking control may not be operated and only the warning signal may be generated, upon determining that the angle of the trailer 2 is greater than or equal to a predetermined angle. This is to prevent swing phenomenon of the trailer 2 by an emergency braking (e.g., a sudden braking that causes a rapid deceleration).

If the vehicle 1 is traveling at an angle on a straight road, the braking control may not be operated and only the warning signal may be generated, upon determining that the trailer 2 is in a position that violates the lane-line restrictions.

In response to the manipulation of the steering wheel being detected (607), the controller 150 may determine the braking control based on a curvature of the road (611). In case of a sharp curve road, swing phenomenon of the trailer may occur, so the braking control is determined based on the curvature thereof. For example, if a driver's intention to steer on a curved road exists and is detected and the curvature of the road is above a threshold curvature, the braking control may not be operated and only the warning signal may be generated.

On the other hand, the vehicle 1 may prevent or reduce jackknife phenomenon or swing phenomenon by adjusting the deceleration amount in addition to changing the timing of the braking control and the timing of the warning signal as described above. In this regard, such features will be described in detail with reference to FIG. 7.

Figure 7:
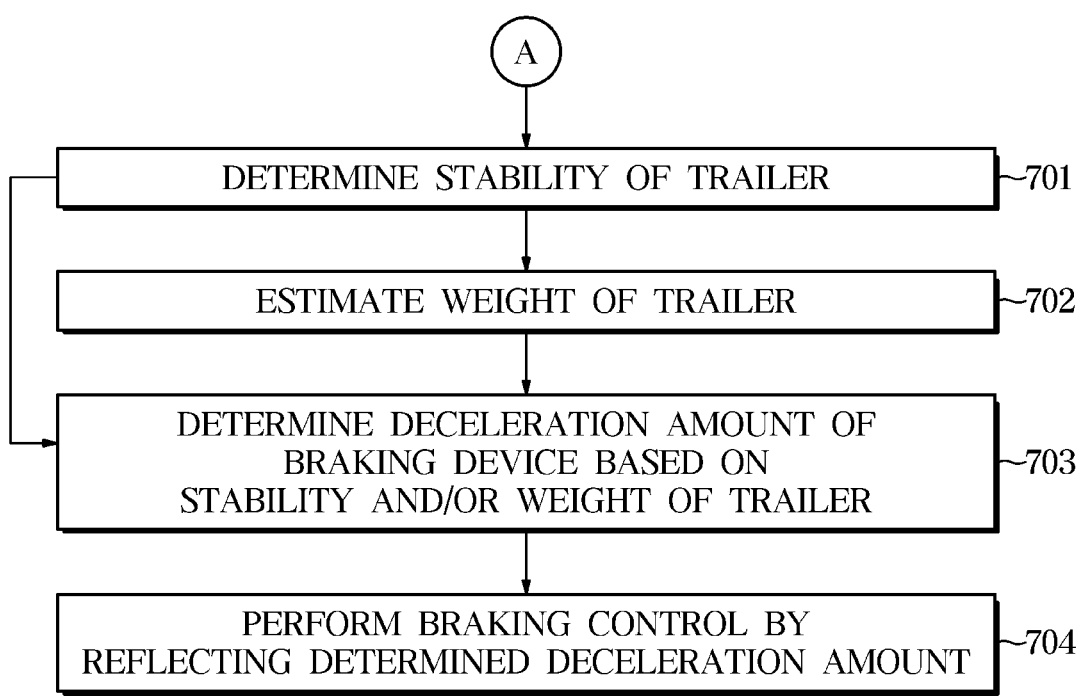
FIG. 7 is a flowchart illustrating a method of controlling the vehicle.

FIG. 7 is a flowchart illustrating a method of controlling a vehicle.

The controller 150 may determine the stability of the trailer 2 (701). The stability may be assessed based on a plurality of levels that may be determined based on at least one of: the rotation angle of the trailer 2, the yaw rate of the trailer 2, and/or the lateral force of axle of the trailer 2. As the angle of rotation of the trailer 2 increases, the difference between the yaw rate of the vehicle 1 and the yaw rate of the trailer 2 may also increase, the magnitude of the lateral force of axle of the trailer 2 may also increase, and the stability may decrease.

The deceleration may be determined according to the levels of stability. The levels of stability may comprises a plurality of levels (e.g., three levels, three stages, or any other number of levels or stages), and the braking control may be performed according to the deceleration based on the determined level of stability. For example, a maximum deceleration may be set to a first deceleration value (e.g., $-10$ m/s$^2$ (meters per second per second) or any other value) at a first level in which the trailer is in a stable state, a second deceleration value (e.g., $-6$ m/s$^2$ or any other value) at a second level in which the trailer is in a metastable state, and a third deceleration value ($-0$ m/s$^2$ or any other value) at a third level in which the trailer is in a unstable state. The maximum deceleration for each level may be stored in the memory 152.

The controller 150 may estimate the weight of the trailer 2 (702). The weight of the trailer 2 may be estimated by monitoring the change in weight of the vehicle 1 by using longitudinal vehicle dynamics, lateral vehicle dynamics, and vertical vehicle dynamics.

For example, in the longitudinal vehicle dynamics model, the mass of the vehicle 1 may be estimated by measuring the speed and acceleration of the vehicle 1. In the lateral vehicle dynamics model, the mass of the vehicle 1 may be estimated through the lateral acceleration and the steering angle of the vehicle 1. In the vertical vehicle dynamics model, the mass of the vehicle 1 may be estimated through an unsprung mass, an elastic modulus, and a vertical acceleration.

The stability may be determined according to the estimated weight of the trailer 2. For example, the weight section of the trailer 2 may comprise a plurality of levels (e.g., three levels, three stages, or any other number of levels or stages), the maximum deceleration may be set to $-10$ m/s$^2$ at a first level in which the trailer has a low-risk weight, $-6$ m/s$^2$ at a second level in which the trailer has a medium-risk weight, and $-0$ m/s$^2$ at a third level in which the trailer has a high-risk weight. The maximum deceleration for each level is stored in the memory 152.

The controller 150 may determine the deceleration amount of the braking device based on the stability and/or weight of the trailer 2 (703), and perform the braking control by reflecting the determined deceleration amount (704).

Hereinafter, various examples based on the above-described control method will be described.

Figure 8:
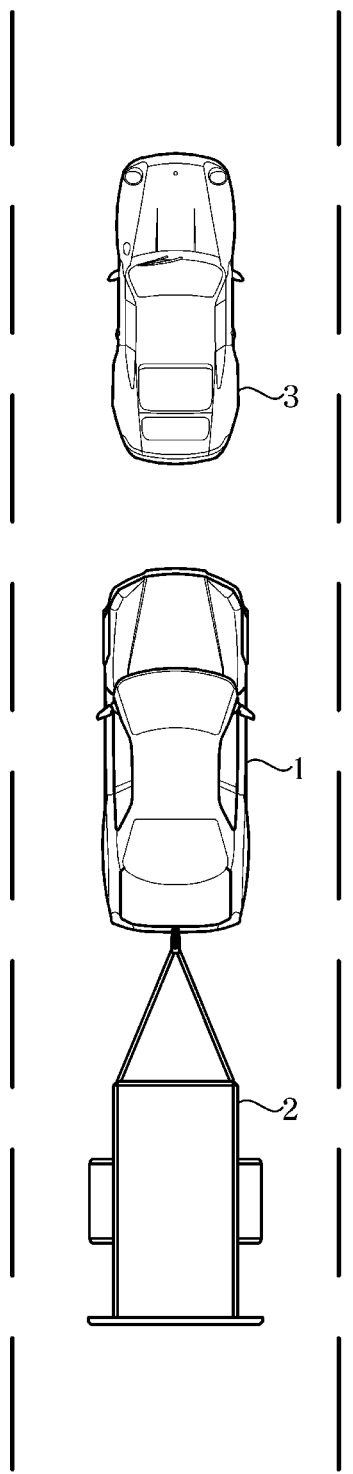
FIG. 8 is a view illustrating in a going-straight state of the vehicle and a low-weight state of the trailer.

FIG. 8 is a view illustrating in a going-straight state of the vehicle and a low-weight state of the trailer.

Referring to FIG. 8, the controller 150 may perform the braking control with the maximum deceleration of $-10$ m/s$^2$ if the vehicle 1 is in a going-straight state, the rotation angle between the vehicle 1 and the trailer 2 is 0, and the trailer 2 is in a low-weight state. The trailer 2 is in a stable state, so a collision with an object ahead 3 may be prevented by maximizing the deceleration amount.

Figure 9:
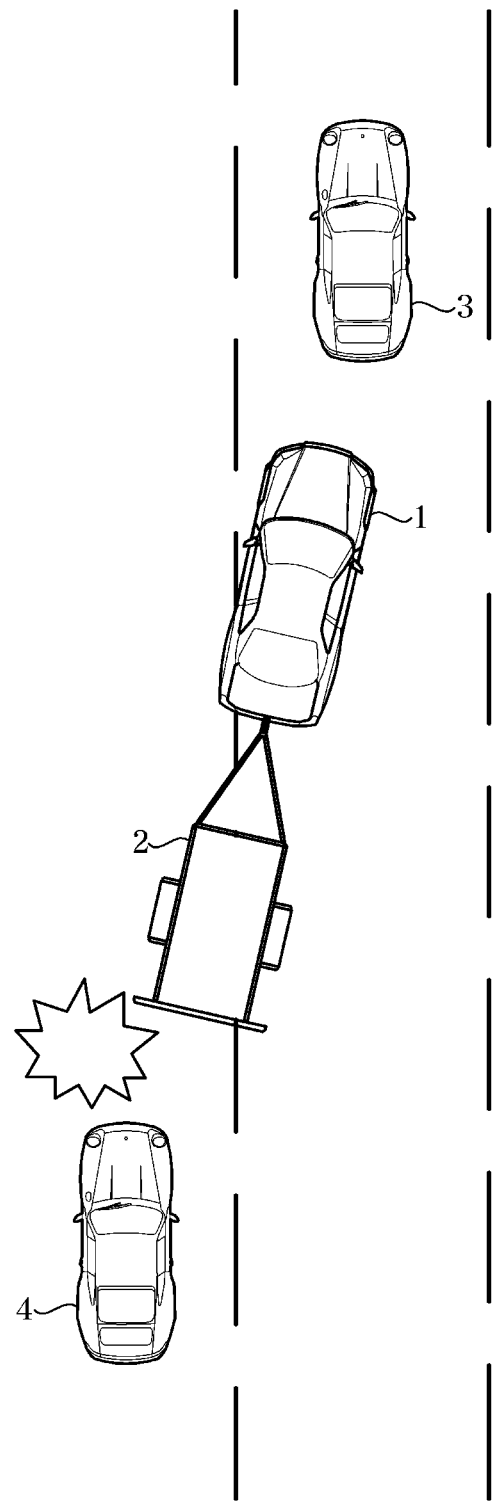
FIG. 9 is a view illustrating in a going-straight state of the vehicle and a lane encroachment state of the trailer.

FIG. 9 is a view illustrating in a going-straight state of the vehicle and a lane encroachment state of the trailer.

Referring to FIG. 9, the vehicle 1 is in a going-straight state, but the position of the trailer 2 is in a different lane from that of the vehicle 1, so that the trailer 2 is in a relatively unstable state than the state shown in FIG. 8. The controller 150 may perform the braking control with the maximum deceleration of $-6$ m/s$^2$. The vehicle 1 may prevent or reduce a collision with the object ahead 3 and simultaneously prevent or reduce a collision between the trailer 2 and an object behind the trailer 2 by applying an appropriate deceleration amount.

Figure 10:
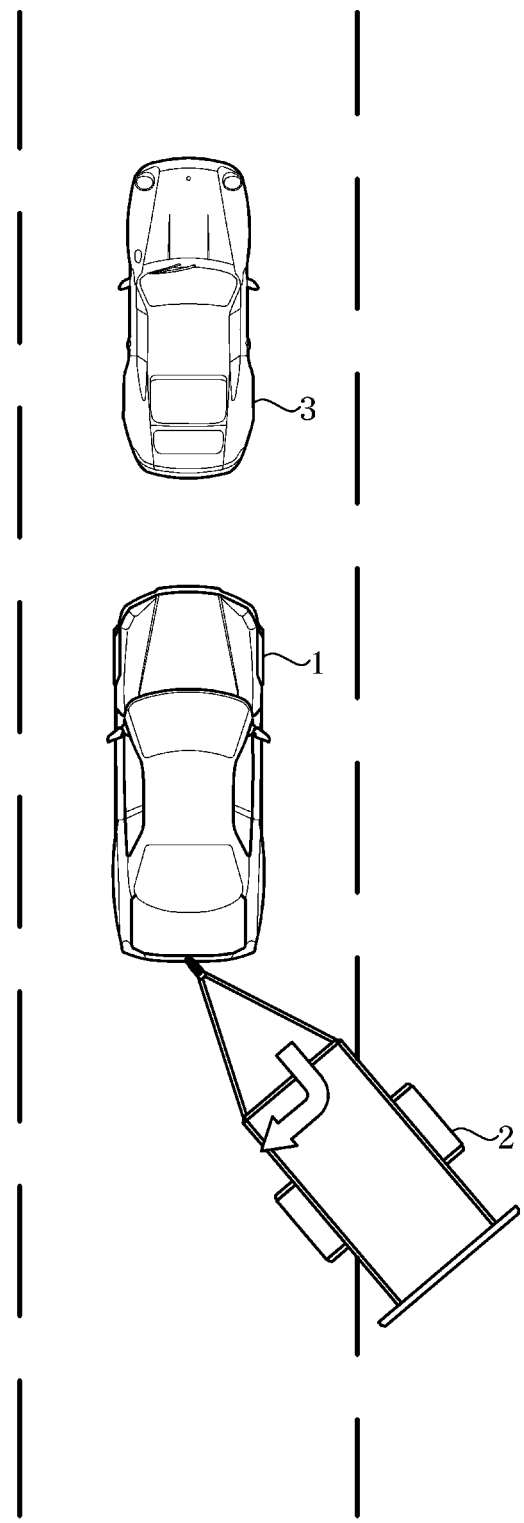
FIG. 10 is a view illustrating a state in which a vehicle goes straight and a rotation angle of the trailer is greater than or equal to a predetermined level.

FIG. 10 is a view illustrating a state in which a vehicle goes straight and a rotation angle of the trailer is greater than or equal to a predetermined level.

In some vehicle control systems, braking control is not based on the rotation angle of the trailer 2. As such, swing phenomenon or jackknife phenomenon may occur for vehicles adopting such vehicle control systems when the braking control is performed in a situation as shown in FIG. 10. According to the braking control features described herein, upon determining that the rotation angle of the trailer 2 satisfies (e.g., is equal to or greater than) a predetermined angle, braking control may be performed such that deceleration of the vehicle 1 does not occur at least for a period of time, and/or the braking control is performed according to the deceleration amount lower than the deceleration amount provided by the FCA function even if the braking control is performed.

Figure 11:
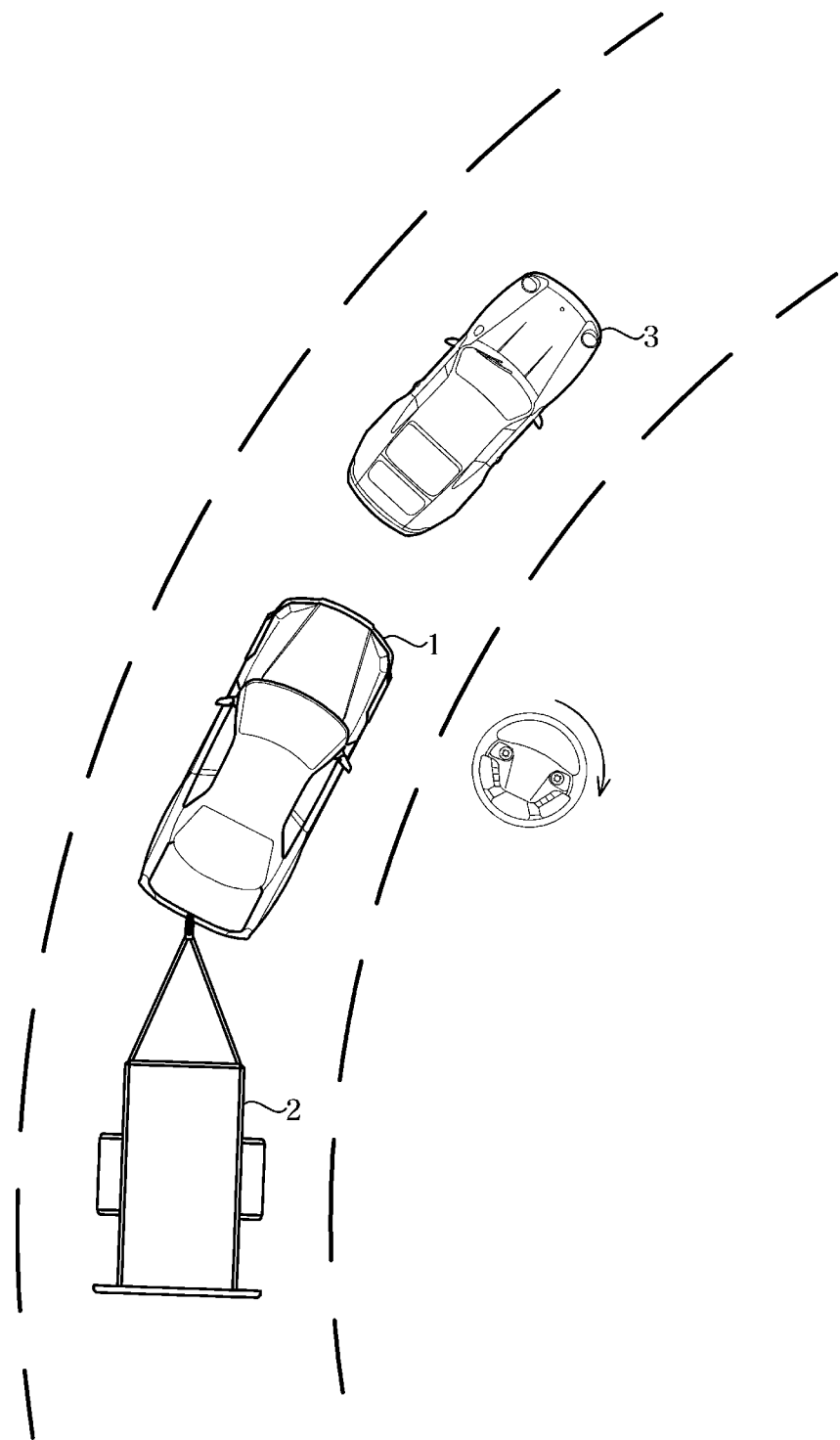
FIG. 11 is a view illustrating a non-straight state of a vehicle.

FIG. 11 is a view illustrating a non-straight state of a vehicle.

For example, in response to the curvature of the road being less than a reference value and the driver's steering wheel manipulation is detected, appropriate braking control may be required. Accordingly, in the situation shown in FIG. 11, the controller 150 may perform the braking control with the maximum deceleration of a first deceleration value (e.g., $-6$ m/s$^2$ or any other value). If the driver does not perform the braking control at all because the driver is under steering, a risk of collision with the object ahead 3 exists, and if the braking control is performed to the maximum, swing phenomenon or jackknife phenomenon may occur. Accordingly, the driver's steering wheel manipulation may be detected and a proper braking control by the controller 150 of the vehicle 1 according to the rotation angle of the trailer 2 and the curvature of the road may be performed.

In an example, the controller 150 may control the braking device 160 so that the braking control thereof does not operate and generate only the warning signal, upon determining that the rotation angle of the trailer 2 is less than a predetermined angle and the curvature of the road on which the vehicle 1 is traveling is equal to or greater than a predetermined reference.

Figure 12:
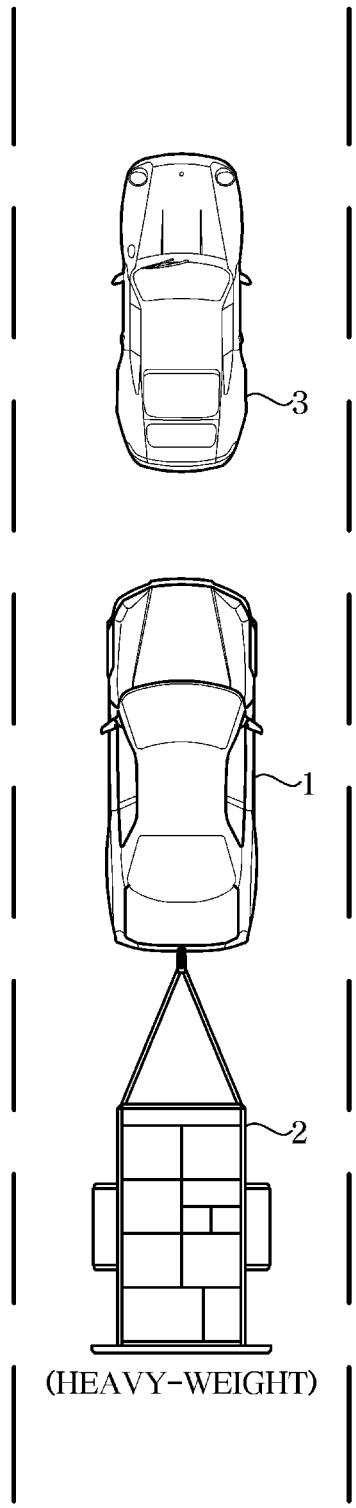
FIG. 12 is a view illustrating in a going-straight state of the vehicle and a heavy-weight state of the trailer.

FIG. 12 is a view illustrating in a going-straight state of the vehicle and a heavy-weight state of the trailer.

Referring to FIG. 12, because the weight of the trailer 2 is in a heavy state, when the emergency braking control is performed by detecting the object ahead 3, it may be expected that a collision with the object ahead 3 due to the inertia of the trailer 2 as well as secondary accidents with other driving vehicles. Accordingly, the controller 150 may generate only the warning signal without performing the braking control (e.g., even if the driver of the vehicle 1 suddenly presses the brake pedal).

A vehicle capable of coupling with a trailer may include a camera disposed on the vehicle to have an external field of view of the vehicle and configured to obtain image data for detecting the trailer and an object in the external field of view, a radar disposed on the vehicle to have an external field of view of the vehicle and configured to obtain radar data for detecting the trailer and the object in the external field of view, a controller configured to determine whether the trailer is coupled by processing the image data and the radar data, perform at least one of generating a warning signal and controlling a braking device according to a forward collision-avoidance assist (FCA) function, and change a timing of the generating the warning signal in response to the trailer being detected to be coupled.

The camera may include a rear camera disposed at a rear of the vehicle to obtain image data for recognizing the trailer, and the radar may include a rear right corner radar installed on a right side of a rear bumper of the vehicle to have a field of sensing facing a rear right side of the vehicle, and a rear left corner radar installed on a left side of the rear bumper of the vehicle to have a field of sensing facing a rear left side of the vehicle, and the controller may obtain coordinates of a plurality of detection points located on sides of the trailer by processing the radar data.

The controller may obtain coordinates of the central point located in the middle among the plurality of detection points, and calculate a rotation angle of the trailer based on the coordinates of the central point and the coordinates of a rotation axis of the trailer.

The controller may obtain coordinates of a first point and a second point located at opposite ends of the plurality of detection points, and calculate a length of the trailer based on the coordinates of the first point, the coordinates of the second point, and the coordinates of the rotation axis of the trailer.

The controller may control the braking device so that a braking control thereof does not operate, and generate only the warning signal, in response to the rotation angle of the trailer being greater than or equal to a predetermined angle.

The controller may advance the timing of generating the warning signal and delay a timing of controlling the braking device, in response to the rotation angle of the trailer being less than a predetermined angle and an acceleration of the vehicle being detected.

The controller may delay the timing of generating the warning signal and a timing of controlling the braking device, in response to the rotation angle of the trailer being less than a predetermined angle and a deceleration of the vehicle being detected.

The controller may determine a braking control of the braking device based on a position of the trailer, in response to the rotation angle of the trailer being less than a predetermined angle and an operation of a steering wheel of the vehicle being not detected.

The controller may calculate a curvature of a road on which the vehicle is traveling, in response to the rotation angle of the trailer being less than a predetermined angle and a steering wheel manipulation of the vehicle being detected, and control the braking device so that a braking control thereof does not operate, and generate only the warning signal, in response to the curvature being equal to or greater than a predetermined reference.

The controller may determine stability of the trailer based on at least one of the rotation angle of the trailer and a weight of the trailer, and determine a deceleration amount of the braking device according to the determined stability.

A method of controlling a vehicle capable of coupling with a trailer is provided. The method may include obtaining, by a controller, image data for detecting the trailer and an object, obtaining, by the controller, radar data for detecting the trailer and the object, determining, by the controller, whether the trailer is coupled by processing the image data and the radar data, and performing, by the controller, at least one of generating a warning signal and controlling a braking device according to a forward collision-avoidance assist (FCA) function, and changing, by the controller, a timing of generating the warning signal in response to the trailer being detected to be coupled.

The obtaining of the image data may further include obtaining, by the controller, image data for recognizing the trailer through a rear camera installed at a rear of the vehicle, the obtaining of the radar data may further include obtaining, by the controller, image data through a rear right corner radar installed on a right side of a rear bumper of the vehicle and a rear left corner radar installed on a left side of the rear bumper of the vehicle, and obtaining, by the controller, coordinates of a plurality of detection points located on sides of the trailer by processing the radar data.

The method may further include obtaining, by the controller, coordinates of the central point located in the middle among the plurality of detection points, and calculating a rotation angle of the trailer based on the coordinates of the central point and the coordinates of a rotation axis of the trailer.

The method may further include obtaining, by the controller, coordinates of a first point and a second point located at opposite ends of the plurality of detection points, and calculating, by the controller, a length of the trailer based on the coordinates of the first point, the coordinates of the second point, and the coordinates of the rotation axis of the trailer.

The method may further include controlling, by the controller, the braking device so that a braking control thereof does not operate and generating only the warning signal, in response to the rotation angle of the trailer being greater than or equal to a predetermined angle.

The method may further include advancing, by the controller, the timing of generating the warning signal and delaying, by the controller, a timing of controlling the braking device, in response to the rotation angle of the trailer being less than a predetermined angle and an acceleration of the vehicle being detected.

The method may further include delaying, by the controller, the timing of generating the warning signal and a timing of controlling the braking device, in response to the rotation angle of the trailer being less than a predetermined angle and a deceleration of the vehicle being detected.

The method may further include determining, by the controller, a braking control of the braking device based on a position of the trailer, in response to the rotation angle of the trailer being less than a predetermined angle and an operation of a steering wheel of the vehicle being not detected.

The method may further include calculating, by the controller, a curvature of a road on which the vehicle is traveling, in response to the rotation angle of the trailer being less than a predetermined angle and a steering wheel manipulation of the vehicle being detected, and controlling, by the controller, the braking device so that a braking control thereof does not operate and generating, by the controller, only the warning signal, in response to the curvature being equal to or greater than a predetermined reference.

The method may further include determining, by the controller, stability of the trailer based on at least one of the rotation angle of the trailer and a weight of the trailer, and determining, by the controller, a deceleration amount of the braking device according to the determined stability.

As is apparent from the above, according to various examples of the present disclosure, it may be possible to detect the state of the trailer by using pre-installed sensor(s), etc., and accordingly there is no need to provide a separate trailer detection device.

Further, the amount of braking may be adjusted in consideration of the trailer state, so it may be possible to prevent or reduce a secondary accident caused by a phenomenon such as a jackknife phenomenon.

The above-described examples may be implemented in the form of a recording medium storing instructions executable by one or more processors of a computer or any other computing devices. The instructions may be stored in the form of program code. When the instructions are executed by a processor, a program module is generated by the instructions so that the operations of the disclosed embodiments may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although various examples of the disclosure have been shown and described, it would be appreciated by those having ordinary skill in the art that changes may be made in the embodiment(s) described herein without departing from the principles and spirit of the disclosure, the scope of which is defined in the claims and their equivalents.

What is claimed is:

1. A vehicle comprising:
a camera configured to capture an external field of view of the vehicle and configured to obtain image data associated with an image, wherein the image comprises a trailer being in proximity to the vehicle in the external field of view;
a radar associated with a second external field of view of the vehicle and configured to obtain radar data associated with the trailer in the second external field of view; and
a controller configured to:
determine, based on the image data and the radar data, whether the trailer is coupled to the vehicle;
perform, based on a forward collision-avoidance assist (FCA) function, at least one of: generating a warning signal, or controlling a braking device; and
change, based on the trailer being coupled to the vehicle, at least one of: a timing of the generating the warning signal, or an operation of the controlling the braking device.

2. The vehicle of claim 1, wherein:
the camera comprises a rear camera to obtain a rear view of the vehicle to capture the image comprising the trailer;
the radar comprises a rear right corner radar installed on a right side of a rear bumper of the vehicle to have a field of sensing associated with a rear right side of the vehicle, and a rear left corner radar installed on a left side of the rear bumper of the vehicle to have a field of sensing associated with a rear left side of the vehicle; and
the controller is further configured to obtain, based on the radar data, coordinates of a plurality of detection points on a side of the trailer.

3. The vehicle of claim 2, wherein the controller is further configured to:
obtain, among the plurality of detection points, coordinates of a central point located in a middle of the side of the trailer; and
calculate, based on the coordinates of the central point and coordinates of a rotation axis associated with the trailer, a rotation angle of the trailer.

4. The vehicle of claim 3, wherein the controller is further configured to:
obtain coordinates of a plurality of points located at opposite ends of the plurality of detection points; and
calculate, based on the coordinates of the plurality of points and the coordinates of the rotation axis of the trailer, a length of the trailer.

5. The vehicle of claim 3, wherein the controller is further configured to, based on the rotation angle of the trailer being greater than or equal to a predetermined angle:
control the braking device so that deceleration of the vehicle does not exceed a threshold deceleration value, and generate the warning signal.

6. The vehicle of claim 3, wherein the controller is further configured to, based on the rotation angle of the trailer being less than a predetermined angle and an acceleration of the vehicle being detected:
advance the timing of generating the warning signal and delay a timing of controlling the braking device.

7. The vehicle of claim 3, wherein the controller is further configured to, based on the rotation angle of the trailer being less than a predetermined angle and a deceleration of the vehicle being detected:
delay the timing of generating the warning signal and delay a timing of controlling the braking device.

8. The vehicle of claim 3, wherein the controller is further configured to:
determine a braking control of the braking device based on:
a position of the trailer;
the rotation angle of the trailer being less than a predetermined angle; and
an operation of a steering wheel of the vehicle being not detected.

9. The vehicle of claim 3, wherein the controller is further configured to:
calculate, based on the rotation angle of the trailer being less than a predetermined angle and a steering wheel manipulation of the vehicle being detected, a curvature of a road on which the vehicle is traveling; and based on the curvature being equal to or greater than a predetermined reference, control the braking device so that deceleration of the vehicle does not exceed a threshold deceleration value and generate the warning signal.

10. The vehicle of claim 3, wherein the controller is further configured to:
   determine stability of the trailer based on at least one of:
      the rotation angle of the trailer; or
      a weight of the trailer; and
   determine, based on the determined stability, a deceleration amount of the braking device.

11. A method comprising:
   obtaining, by a controller of a vehicle, image data associated with an image, wherein the image comprises a trailer being in proximity to the vehicle;
   obtaining, by the controller, radar data associated with the trailer;
   determining, by the controller and based on the image data and the radar data, whether the trailer is coupled to the vehicle;
   performing, by the controller and based on a forward collision-avoidance assist (FCA) function, at least one of: generating a warning signal, or controlling a braking device; and
   changing, by the controller and based on the trailer being coupled to the vehicle, at least one of: a timing of generating the warning signal, or an operation of the controlling the braking device.

12. The method of claim 11, wherein:
   obtaining the image data comprises:
      obtaining, by the controller, the image data via a rear camera of the vehicle;
   obtaining the radar data comprises:
      obtaining, by the controller, the radar data via a rear right corner radar installed on a right side of a rear bumper of the vehicle and a rear left corner radar installed on a left side of the rear bumper of the vehicle; and
   the method further comprises obtaining, by the controller and based on the radar data, coordinates of a plurality of detection points on a side of the trailer.

13. The method of claim 12, further comprising:
   obtaining, by the controller and among the plurality of detection points, coordinates of a central point located in a middle of the side of the trailer; and
   calculating, based on the coordinates of the central point and coordinates of a rotation axis of the trailer, a rotation angle of the trailer.

14. The method of claim 13, further comprising:
   obtaining, by the controller, coordinates of a plurality of points located at opposite ends of the plurality of detection points; and
   calculating, by the controller and based on the coordinates of the plurality of points and the coordinates of the rotation axis of the trailer, a length of the trailer.

15. The method of claim 13, further comprising, based on the rotation angle of the trailer being greater than or equal to a predetermined angle:
   controlling, by the controller, the braking device so that deceleration of the vehicle does not exceed a threshold deceleration value; and
   generating the warning signal.

16. The method of claim 13, further comprising, based on the rotation angle of the trailer being less than a predetermined angle and an acceleration of the vehicle being detected:
   advancing, by the controller, the timing of generating the warning signal; and
   delaying, by the controller, a timing of controlling the braking device.

17. The method of claim 13, further comprising, based on the rotation angle of the trailer being less than a predetermined angle and a deceleration of the vehicle being detected:
   delaying, by the controller, the timing of generating the warning signal and a timing of controlling the braking device.

18. The method of claim 13, further comprising:
   determining, by the controller, a braking control of the braking device based on:
      a position of the trailer;
      the rotation angle of the trailer being less than a predetermined angle; and
      an operation of a steering wheel of the vehicle being not detected.

19. The method of claim 13, further comprising:
   calculating, by the controller and based on the rotation angle of the trailer being less than a predetermined angle and a steering wheel manipulation of the vehicle being detected, a curvature of a road on which the vehicle is traveling; and
   based on the curvature being equal to or greater than a predetermined reference, controlling, by the controller, the braking device so that deceleration of the vehicle does not exceed a threshold deceleration value and generating, by the controller, the warning signal.

20. The method of claim 13, further comprising:
   determining, by the controller, stability of the trailer based on at least one of:
      the rotation angle of the trailer; or
      a weight of the trailer; and
   determining, by the controller and based on the determined stability, a deceleration amount of the braking device.

* * * * *